United States Patent
DeLuca et al.

(10) Patent No.: US 9,411,397 B2
(45) Date of Patent: *Aug. 9, 2016

(54) MANAGING A PORTAL APPLICATION

(75) Inventors: Lisa Seacat DeLuca, San Francisco, CA (US); Dana Lea Price, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 893 days.

This patent is subject to a terminal disclaimer.

(21) Appl. No.: 13/417,887

(22) Filed: Mar. 12, 2012

(65) Prior Publication Data

US 2012/0246648 A1 Sep. 27, 2012

Related U.S. Application Data

(63) Continuation of application No. 13/053,585, filed on Mar. 22, 2011.

(51) Int. Cl.
G06F 3/0484 (2013.01)
G06F 1/32 (2006.01)
G06F 17/30 (2006.01)

(52) U.S. Cl.
CPC ........ *G06F 1/3212* (2013.01); *G06F 17/30873* (2013.01); *Y02B 60/1292* (2013.01); *Y02B 60/188* (2013.01)

(58) Field of Classification Search
CPC ..................................................... G06F 3/0484
USPC ................... 715/742, 738, 744; 709/227, 223
See application file for complete search history.

(56) References Cited

U.S. PATENT DOCUMENTS

| | | | |
|---|---|---|---|
| 7,376,900 B2 | 5/2008 | Guido et al. | |
| 7,407,108 B1 | 8/2008 | Euler et al. | |
| 7,493,564 B2 | 2/2009 | Swanson et al. | |
| 7,761,853 B2 | 7/2010 | Hirata et al. | |
| 2003/0156074 A1 | 8/2003 | Ranganathan et al. | |
| 2005/0065913 A1* | 3/2005 | Lillie | G06F 17/30873 |
| 2006/0005137 A1 | 1/2006 | Jolley | |
| 2006/0070002 A1* | 3/2006 | Guido | G06F 17/3089 715/733 |
| 2006/0155682 A1* | 7/2006 | Lection | G06F 17/3089 |
| 2006/0212798 A1* | 9/2006 | Lection | G06F 9/54 715/234 |
| 2006/0242249 A1* | 10/2006 | Swanson | G06F 17/3089 709/206 |
| 2006/0242582 A1* | 10/2006 | Swanson | G06F 17/3089 715/733 |
| 2007/0121878 A1 | 5/2007 | Shaffer et al. | |

(Continued)

FOREIGN PATENT DOCUMENTS

| | | |
|---|---|---|
| CN | 1984169 A | 6/2007 |
| CN | 101248404 A | 8/2008 |

(Continued)

OTHER PUBLICATIONS

Robin Kravets, et al., "Application-Driven Power Management for Mobile Communication", Wireless Networks, vol. 6 Issue 4, Jul. 2000, ACM.

*Primary Examiner* — Daeho Song
(74) *Attorney, Agent, or Firm* — Steven L. Nichols; Fabian VanCott

(57) ABSTRACT

A method of managing a portal application includes, in a device comprising at least one processor that executes a portal application, establishing a trigger for preserving resources for the device; determining in the device that the trigger has occurred; and pausing operations of a portlet module within the portal application executed by the device.

20 Claims, 10 Drawing Sheets

(56) References Cited

U.S. PATENT DOCUMENTS

| | | | |
|---|---|---|---|
| 2007/0240063 A1* | 10/2007 | Cheng | G06F 17/30873 715/741 |
| 2008/0200154 A1 | 8/2008 | Maharajh et al. | |
| 2008/0222613 A1* | 9/2008 | Allen | G06F 17/30038 717/128 |
| 2008/0307201 A1 | 12/2008 | Flachs et al. | |
| 2009/0172182 A1 | 7/2009 | Yoon | |
| 2009/0210537 A1* | 8/2009 | Irwin | H04L 69/32 709/227 |
| 2009/0293062 A1* | 11/2009 | Amir | G06F 9/485 718/104 |
| 2010/0030901 A1* | 2/2010 | Hallberg | H04N 5/44513 709/228 |
| 2010/0197219 A1* | 8/2010 | Issa | H04H 20/57 455/3.06 |
| 2011/0041078 A1* | 2/2011 | Park | G06F 9/4443 715/746 |
| 2011/0214078 A1 | 9/2011 | Klask et al. | |
| 2011/0252378 A1 | 10/2011 | Anzures et al. | |
| 2012/0066632 A1 | 3/2012 | Sundermeyer et al. | |

FOREIGN PATENT DOCUMENTS

| | | |
|---|---|---|
| CN | 101385246 | 3/2009 |
| WO | 2011011120 A1 | 1/2011 |
| WO | 2011126502 | 10/2011 |

\* cited by examiner

MANAGING A PORTAL APPLICATION

RELATED APPLICATION

The present application is a continuation of, and claims priority under 35 U.S.C. §120 from, U.S. application Ser. No. 13/053,585, filed Mar. 22, 2011, entitled "MANAGING A PORTAL APPLICATION," which is incorporated herein by reference in its entirety.

BACKGROUND

A portal application is a tool that aggregates information from diverse sources onto a page for quick access by a user. Generally this information is displayed to the user through a collection of portlets, which are autonomous user interface software components that can be embedded into a page displayed by the portal application. For example, a portal application may display an email portlet which communicates with an email server and displays recent email messages to the user, a calendar portlet which communicates with a calendar server and displays the user's calendar to the user, a news portlet which communicates with one or more news servers to display a list of headlines to the user, and a weather portlet which communicates with a weather server to display a current weather forecast to the user.

Portal applications are widely popular with corporations and other large entities. For example, many corporate intranets offer a large selection of information accessible to employees, and customized portlets may be used to deliver this information to the employees logging onto the intranet. Through the use of a portal application, the content from the corporate intranet that is presented to a particular employee logging on to the intranet may be customized based on the employee's position and/or personal preferences.

The inherent advantages of portal applications, together with the increasing availability and popularity of internet-enabled mobile devices, have led to a burgeoning demand for portal applications that are accessible on mobile, battery-powered devices. However, because many of the portlets available through such portal applications rely on data connections to the internet and/or other networks to function properly, portal applications can lead to heavy consumption of battery power in mobile devices. This consumption may shorten the usable life of a mobile device between battery charges.

BRIEF SUMMARY

A method of managing a portal application includes: in a device having at least one processor that executes a portal application, establishing a trigger for preserving resources in the device; determining in the device that the trigger has occurred; and pausing operations of a portlet module within the portal application executed by the device.

A mobile device includes: a processor that executes a portal application to implement a plurality of portlet modules; and a user interface that allows a user to establish a trigger for reducing power consumption in the mobile device, the processor being configured to pause operations in a number of the portlet modules in the portal application in response to the trigger occurring.

A computer program product for managing a portal application includes a tangible computer readable storage medium having computer readable program code embodied therewith. The computer readable program code has: computer readable program code configured to establish a trigger for reducing power consumption in a device that executes a portal application; computer readable program code configured to determine that the trigger has occurred; and computer readable program code configured to pause operations of a portlet module within the portal application.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
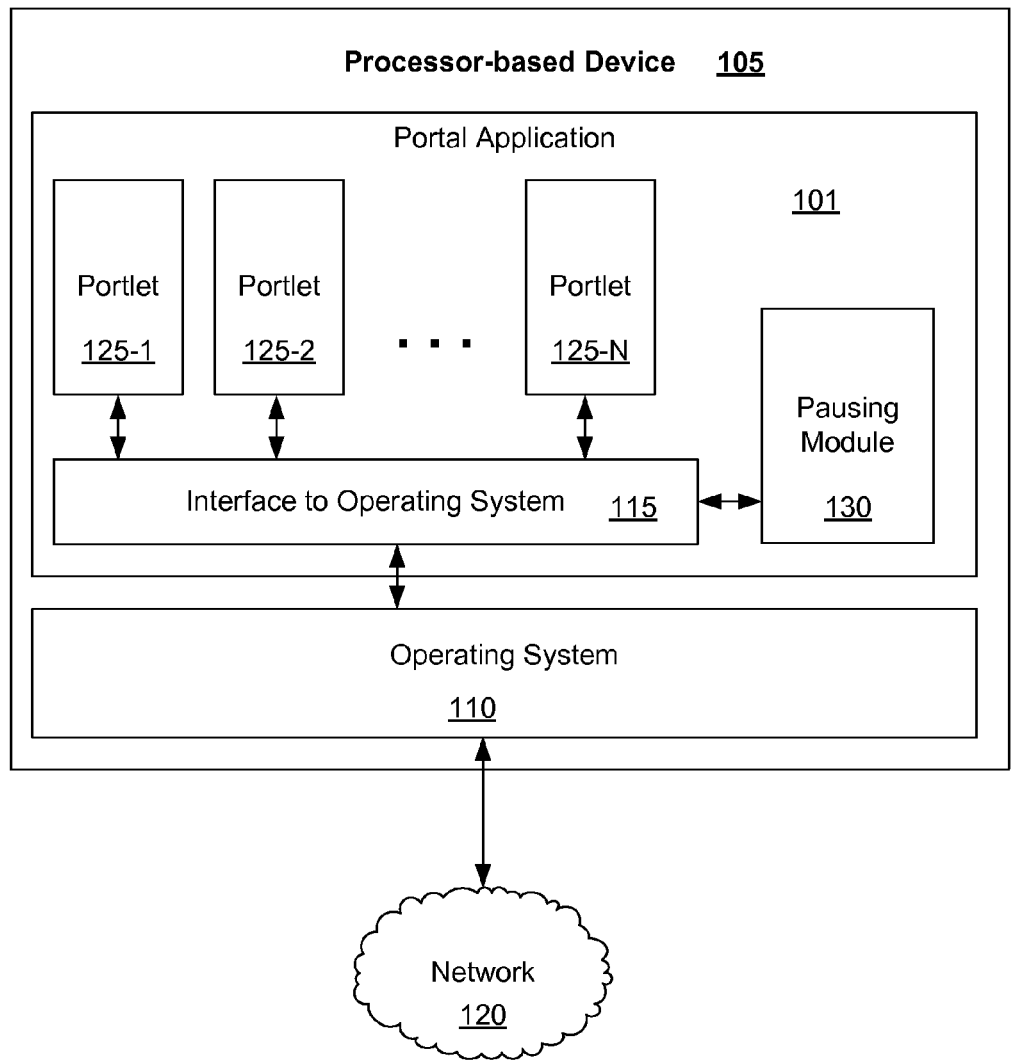
FIG. 1 is a block diagram of an illustrative portal application executed by a mobile device according to one example of principles described herein.

The present specification discloses methods, systems, and computer program products for managing the power consumption of a portal application in a device, such as a battery-powered mobile device or any other device for which enhanced power consumption is desired. According to certain examples of these methods, systems, and computer program products, operations of one or more portlets displayed by the portal application may be selectively paused in response to one or more triggers for conserve power in the device. The paused portlet(s) may resume operations in response to another trigger, such as manual input from a user.

As used in the present specification and in the appended claims, the term "portal application" refers to any machine-readable application, including web applications and websites, that aggregates embedded portlets for display to a user.

As used in the present specification and in the appended claims, the term "portlet" refers any autonomous embeddable user interface functional component.

As used in the present specification and in the appended claims, the term "trigger" refers to an event associated with a predetermined action to be taken upon detecting that the event has occurred.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the Figures, FIG. 1 is a block diagram of an illustrative portal application (101) executed by a processor-based device (105) according to one example of principles described herein. The processor-based device executes an operating system (110), which provides an interface between the portal application (101) and the hardware resources of the device (105). Thus, the portal application (101) may display a portal page to a user on a display of the device (105) by virtue of an interface (115) between the portal application (101) and the operating system (110). Through the operating system (110), the portal application (101) may also access an external network (120) to which the device (105) belongs, such as the Internet, an intranet, or any other network may suit a particular implementation of the principles described herein.

As shown in FIG. 1, the portal application (101) aggregates and manages multiple portlets (125-1 to 125-N). Each portlets (125-1 to 125-N) may, by virtue of the portal application (101), the interface (115) to the operating system (110), and the operating system (110), display information to and interact with a user of the device (105). For example, if the processor-based device (105) is a smartphone, the user may view a display of the portlets (125-1 to 125-N) and interact with individual portlets (125-1 to 125-N) through a touch screen on the smartphone.

Because at least some of the information provided by individual portlets (125-1 to 125-N) to the user of the processor-based device (105) must first be obtained from a server through the external network (120), each portlet (125-1 to 125-N) may be configured to issue method and/or service calls to the operating system (110) and/or the external network (120). Through the use of these calls, each portlet (125-1 to 125-N) may autonomously control what it displays to the user and how it interacts with the user.

As shown in FIG. 1, the portal application (101) may also include a pausing module (130) configured to selectively pause and restart operations of one or more of the portlets (125-1 to 125-N) in response to detecting the occurrence of respective pausing and restarting triggers. By selectively pausing and restarting operations of one or more of the portlets (125-1 to 125-N), power may be conserved in the processor-based device (105), thereby extending the battery life of the device (105) and/or reducing the expenses associated with operating the device (105). As will be explained in more detail below, the operations of a portlet (125-1 to 125-N) may be paused by disabling any service or method calls originating from the paused portlet.

The triggers for pausing and restarting one or more portlets (125-1 to 125-N) with the pausing module (130) may be set by the user of the device (105), by a network administrator, and/or be preset in the device (105) or the portal application (101). In certain examples, the triggers for pausing and restarting various portlet (125-1 to 125-N) may set and enforced by a single portal application (101). In alternate examples, the device (105) may be configured to execute multiple portal applications (101), in which case the triggers for pausing and restarting the portlets (125-1 to 125-N) of the various portal applications (101) may be enforced at a device (105) level. In such examples, the pausing module (130) may be implemented at the operating system (110) level rather than at the level of the portal application (101) (shown in FIG. 1).

In certain examples, multiple sets of triggers may be established for pausing and restarting different portlets (125-1 to 125-N). The triggers may be specific to portlets (125-1 to 125-N) or applicable to all portlets (125-1 to 125-N) running in a portal application (101) executed by the device (105).

In certain examples, triggers for pausing or restarting one or more portlets (125-1 to 125-N) may be based on a measured level of activity for the one or more portals (125-1 to 125-N), an elapsed time for which the one or more portals (125-1 to 125-N) have maintained a certain degree of activity, and the like. For instance, if a portlet (125-1 to 125-N) has been inactive for more than a threshold amount of elapsed time, this measured inactivity may serve as a trigger to pause operations of that portlet.

In additional or alternative examples, triggers for pausing or restarting one or more portlets (125-1 to 125-N) may be based on a measured power consumption associated with the one or more portlets (125-1 to 125-N). In related additional or alternative examples, triggers for pausing or restarting one or more portlets (125-1 to 125-N) may be based on the amount of system resources requested for the one or more portlets (125-1 to 125-N). Such triggers may further be based on the activity of the one or more portlets (125-1 to 125-N). For instance, a portlet (125-1 to 125-N) using a threshold amount of power or requesting a threshold amount of system resources may not serve as a trigger to pause the portlet (125-1 to 125-N) if the user of the device (105) is actively using or interacting with that portlet (125-1 to 125-N). However, if the portlet (125-1 to 125-N) is using the threshold amount of power or requesting the threshold amount of system resources and the user is not actively using or interacting with that portlet (125-1 to 125-N), this combination of factors may trigger the pausing of that portlet (125-1 to 125-N).

In additional or alternative examples, triggers for pausing or restarting one or more portlets (125-1 to 125-N) may be based on manual input received from the user of the device (105). For example, a user may notice that the battery charge for the device (105) is getting low and instruct the portal application (101) and/or the operating system (110) to pause one or more specific portlets (125-1 to 125-N). Similarly, if the user desires to use a paused portlet (125-1 to 125-N), the user may instruct the portal application (101) and/or the operating system (110) to restart that particular paused (125-1 to 125-N).

Figure 2:
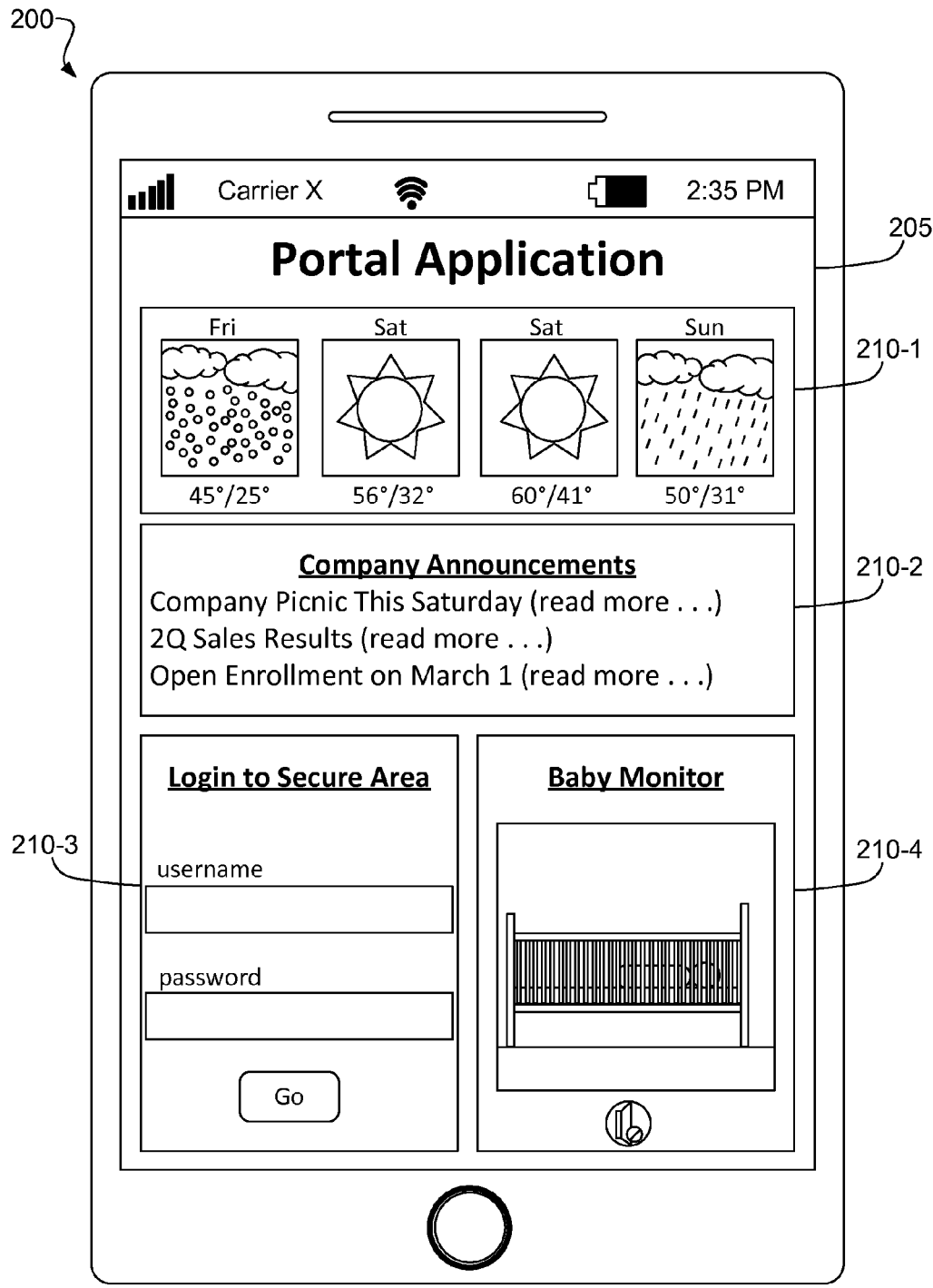
FIG. 2 is a diagram of an illustrative portal application displayed on a mobile device according to one example of principles described herein.

Referring now to FIG. 2, a diagram is shown of an illustrative mobile device (200) executing a portal application consistent with the principles described herein. The portal application may be, for example, a native application stored by the mobile device (200) or a web application or website accessed through a web browser of the mobile device (200). A display page from the portal application is shown on a touch screen (205) of the mobile device (200). The display screen includes a separate display area for each of the portlets (210-1 to 210-4) managed by the portal application. In the example of FIG. 2, the portal application manages a weather portlet (210-1) that retrieves a weather forecast from a server and displays the forecast, a company announcements portlet (210-2) that retrieves a list of company announcements from a server and displays a list of links allowing the user to access the company announcements, a portlet (210-3) that allows a user to log on to a secure area, and a portlet (210-4) that streams live video from a baby monitor to the user of the mobile device (200).

Figure 3:
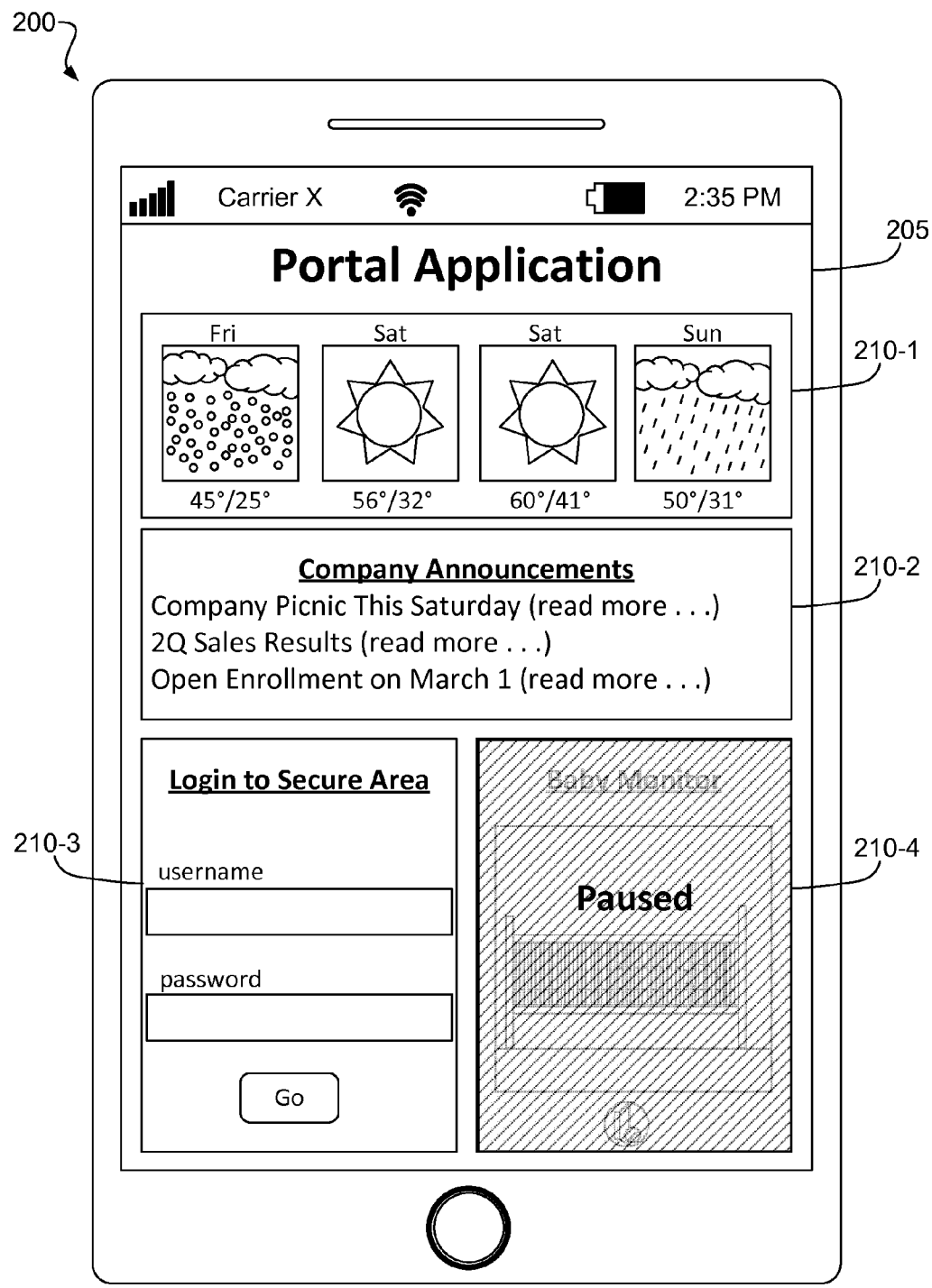
FIG. 3 is a diagram of an illustrative portal application with a paused portlet displayed on a mobile device according to one example of principles described herein.
Figure 4:
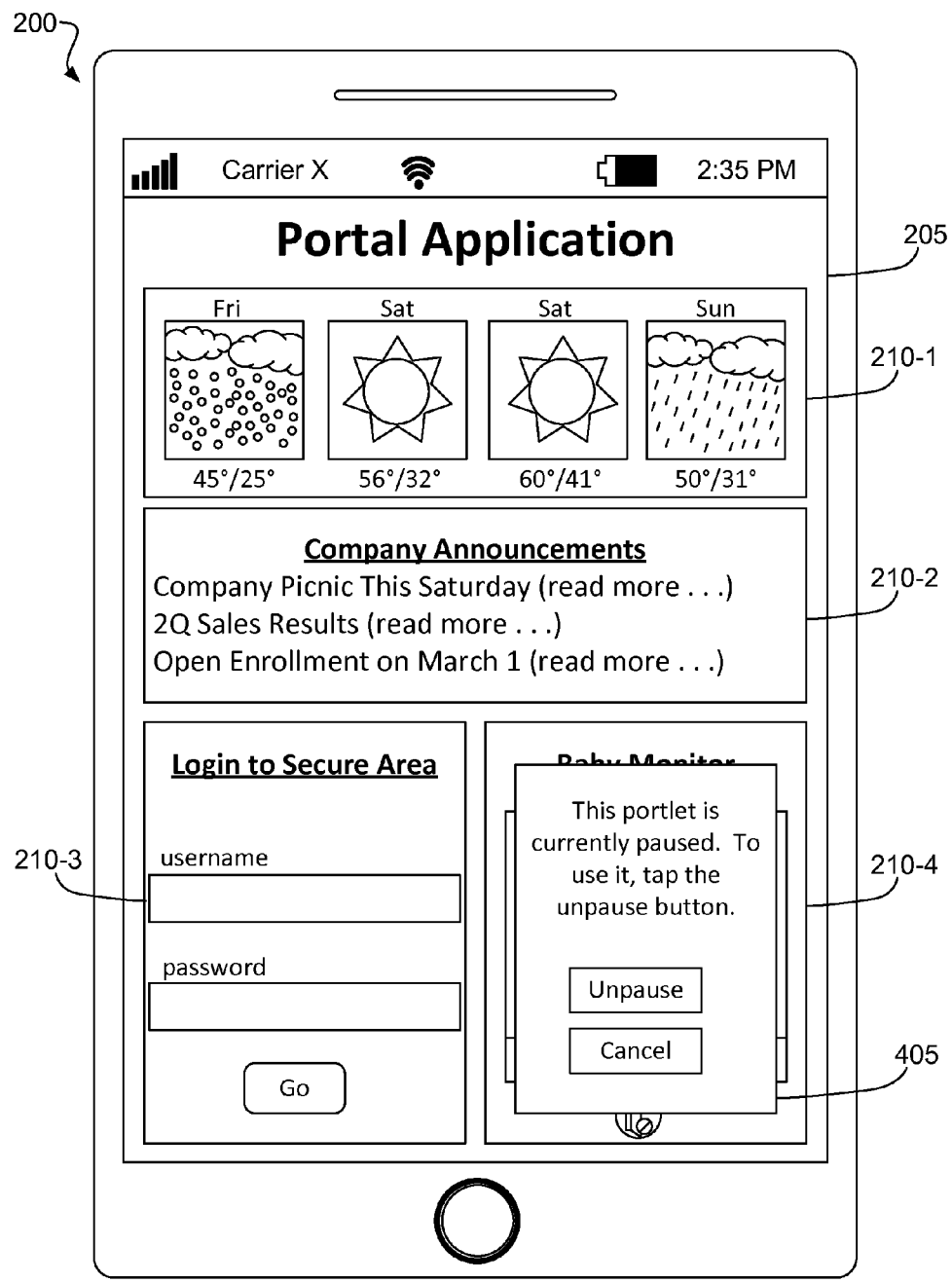
FIG. 4 is a diagram of an illustrative portal application with a paused portlet displayed on a mobile device according to one example of principles described herein.
Figure 5:
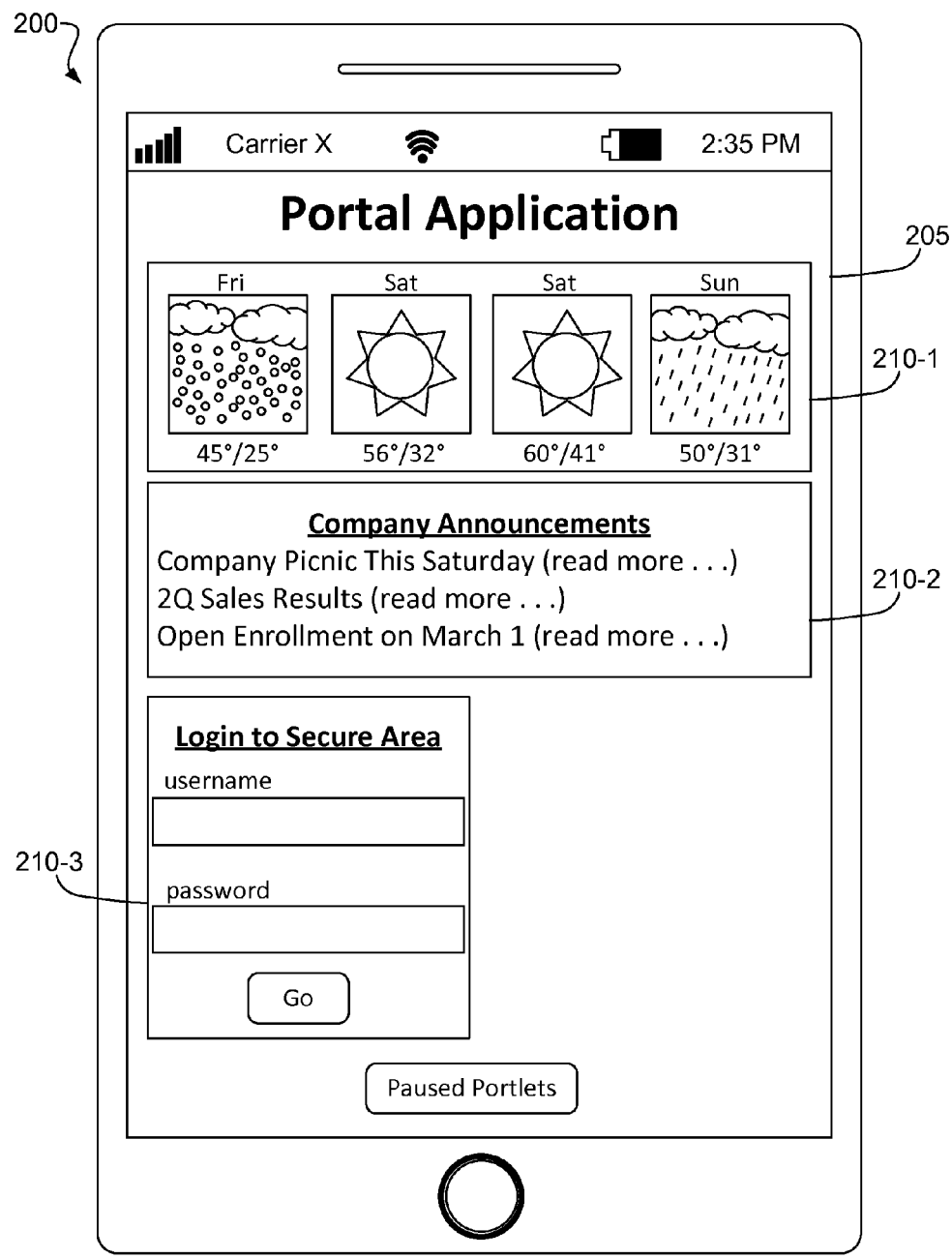
FIG. 5 is a diagram of an illustrative portal application with a paused portlet displayed on a mobile device according to one example of principles described herein.

FIGS. 3, 4, and 5 show different examples of how the appearance of the display page of the portal application from FIG. 2 may be altered to indicate that the baby monitor portlet (210-4) has been paused. In FIG. 3, the display area allocated to the baby monitor portlet (210-4) is grayed out. Additionally or alternatively, the word "paused" or another indication of the paused state of the portlet (210-4) may be displayed over the paused portlet (210-4). In this example, the user may restart the paused portlet (210-4) by tapping on the display area of the paused portlet (210-4) or by accessing a menu of the portal application.

In FIG. 4, the display area of the paused portlet (210-4) is covered by a window indicating that the paused state of the portlet (210-4) and providing the user the option to restart the paused portlet (210-4) and/or clear the window (405). In some examples, this window (405) may be displayed whenever a portlet (210-1 to 210-4) is paused. Additionally or alternatively, the window (405) may be displayed in response to a user attempting to interact with a paused portlet (210-4) that is paused, regardless of whether any indication of the paused state of the portlet (210-4) had been previously given.

In FIG. 5, the paused portlet (210-4, FIG. 2) has been removed from the display area of portal application, such that the display area that was allocated to the paused portlet (210-4) is now blank. Once the paused portlet (210-4) is restarted, the portal application may resume displaying the portlet (210-4) in its allocated area.

Figure 6:
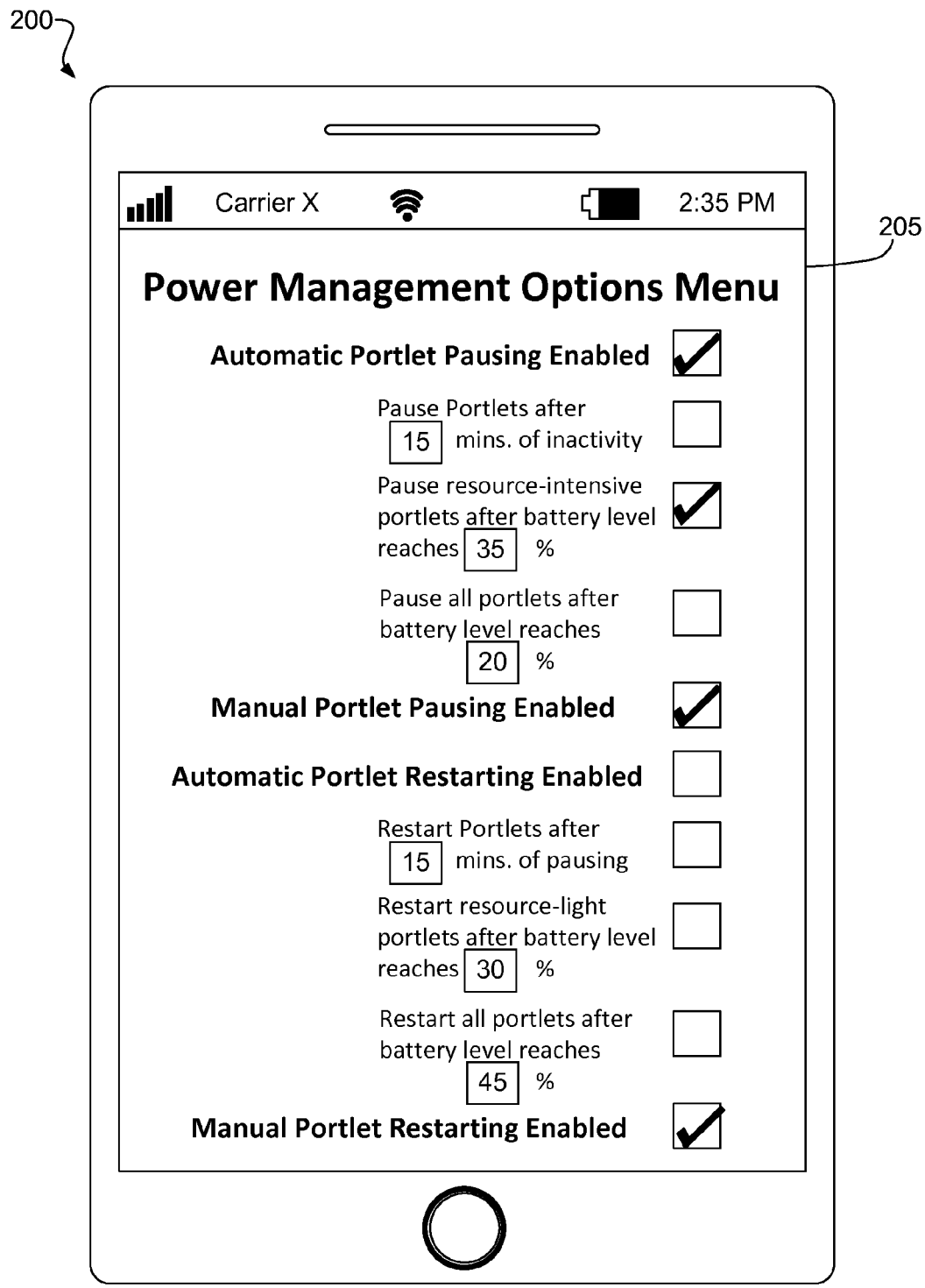
FIG. 6 is a diagram of an illustrative menu screen for setting power saving triggers on a portal application executed by a mobile device according to one example of principles described herein.

FIG. 6 shows the mobile device (200) of FIG. 2 displaying an illustrative power options menu implemented by the portal application or the operating system of the mobile device (200). Through this menu, a user of the device (200) may specify the triggers to be enforced for pausing and restarting the portlets (210-1 to 210-4). The user may also enter certain parameters for the automatic pausing and restarting of the portlets. For example, the user may specify the threshold number of minutes of inactivity after which a portlet (210-1 to 210-4) will be automatically paused; the threshold number of minutes after pausing a portlet (210-1 to 210-4) at which the portlet (210-1 to 210-4) will be restarted; a threshold battery level which will trigger an automatic pausing of resource-intensive portlets (210-1 to 210-4); a threshold battery level which will trigger an automatic pausing of all portlets (210-1 to 210-4); a threshold battery level which will trigger restarting resource-light portlets (210-1 to 210-4); and a threshold battery level which will trigger restarting all portlets (210-1 to 210-4). In other examples, the user may be able to enable and/or customize triggers based on different criteria than those shown in FIG. 4. Furthermore, in other examples, the user may be permitted to manually create one or more new triggers based on criteria selected by the user.

Figure 7:
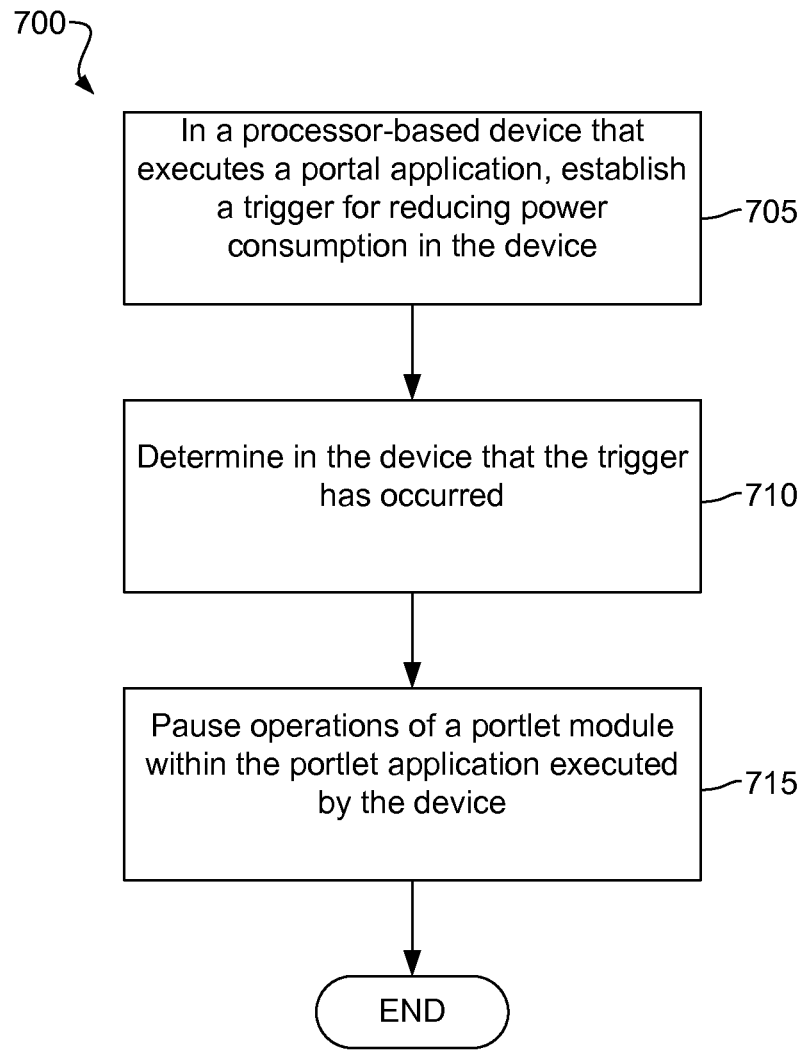
FIG. 7 is a block diagram of an illustrative method of managing a portal application, according to one example of principles described herein.

FIG. 7 shows a block diagram of an illustrative method (700) of managing a portal application, according to one example of the principles described herein. According to the method (700), a trigger is established (block 705) for reducing power consumption in a processor-based device that executes a portal application. A determination is then made (block 710) in the device that the trigger has occurred, and the operations of a portlet module within the portal application executed by the device are paused (block 715) in response to the trigger.

Figure 8A:
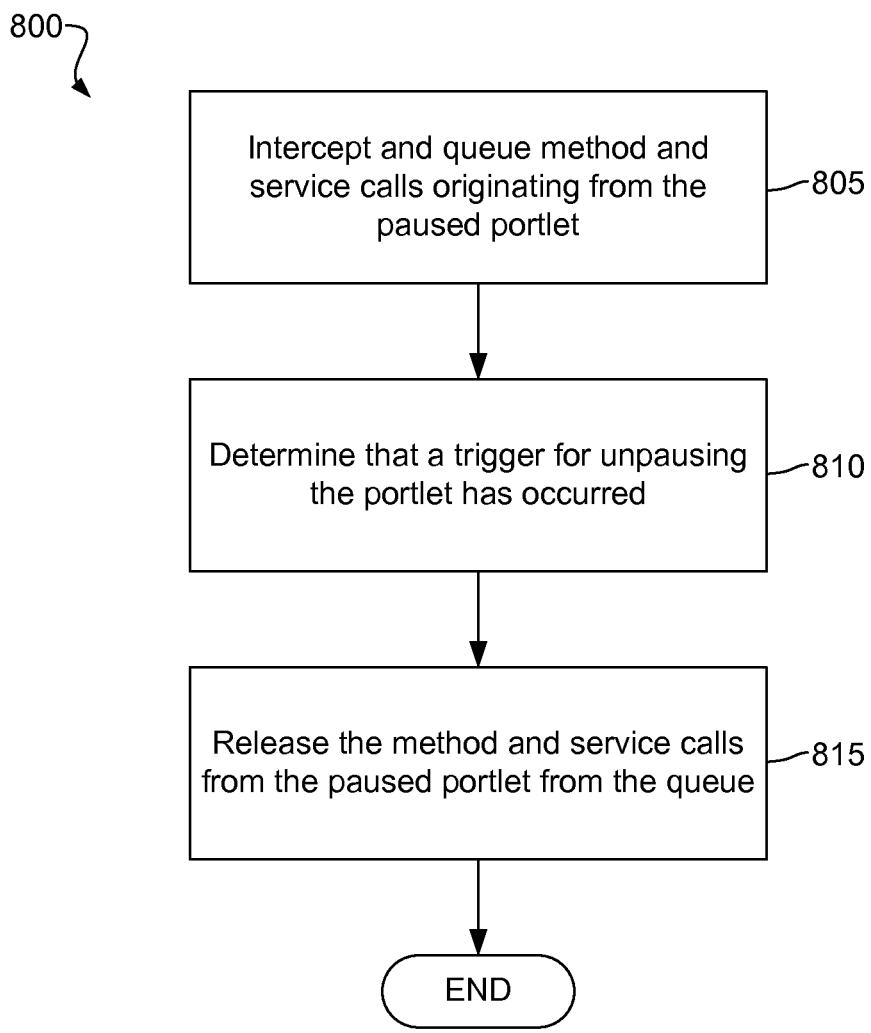
FIGS. 8A and 8B are block diagrams of respective illustrative methods of pausing and restarting a portlet in a portal application, according to one example of principles described herein.
Figure 8B:
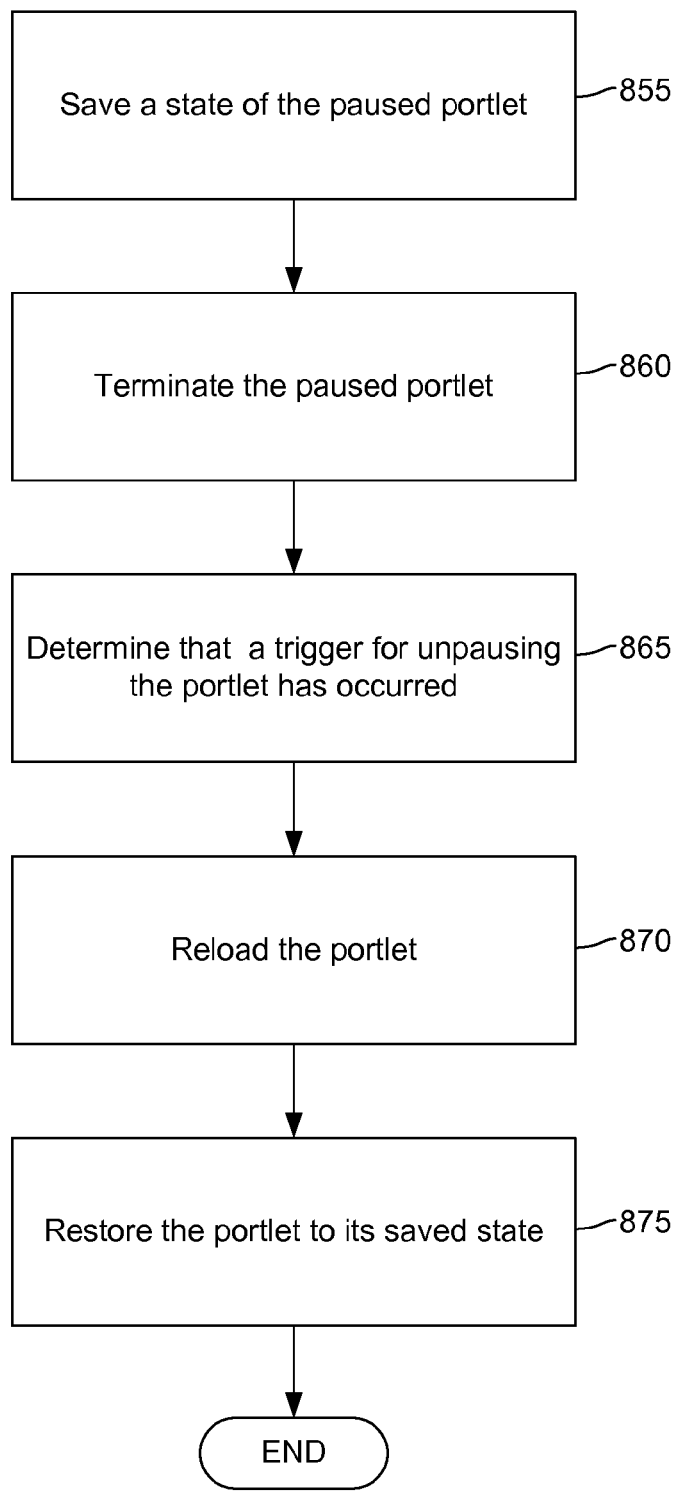

FIGS. 8A and 8B show block diagrams of illustrative methods (800, 850) for pausing and restarting a portlet implemented in a portal application executed by a processor-based device. In the method (800) of FIG. 8A, any method or service calls originating from the paused portlet are intercepted and queued (block 805) for the period of time during which the portlet is paused. Thus, any method or service calls directed from the paused portlet to the operating system of the device executing the portal application or to an external network will not be received by their intended destinations while the portlet is paused. The queued method or service calls may be stored in a temporary cache of the main memory or local storage of the device executing the portal application. Once it has been determined (block 810) that a trigger for restarting the portlet has occurred, the queued method or service calls may be released (block 815) from the queue to their intended destinations.

In the method (850) of FIG. 8B, a state of the paused portlet is saved (block 855) to a temporary cache in the main memory or local storage of the device executing the portal application, and execution of the paused portlet is terminated (block 860). Once a determination has been made (block 865) that a trigger for unpausing the portlet has occurred, the portlet is reloaded (block 870) by the portal application, and restored (block 875) to its saved state.

The methods (800, 850) of FIGS. 8A and 8B may be particularly useful when continuity between the operations of a portlet prior to pausing and the operations of the portlet after restarting. However, if such continuity is not necessary for a particular portlet or portal application, a portlet may be paused by simply blocking any service or method calls made by the paused portlet during the period for which the portlet is paused.

Figure 9:
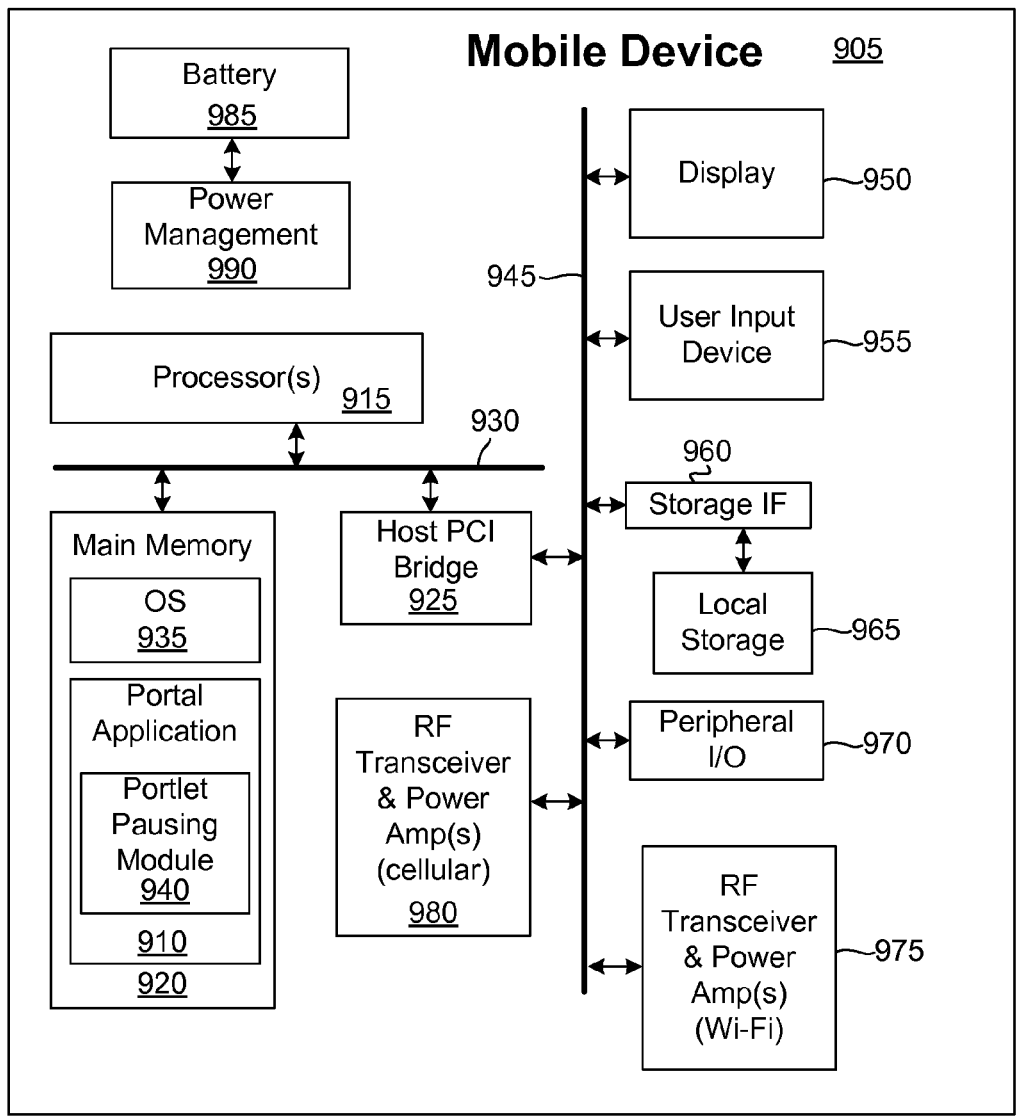
FIG. 9 is a block diagram of an illustrative mobile device, according to one example of principles described herein.

FIG. 9 is a block diagram of an illustrative mobile device (905) which may implement a portal application (910) according to the principles described in the present specification. The mobile device (905) may include at least one processor (915). The processor (915) of the mobile device (905) may be single-core processor with a single Central Processing Unit (CPU) or a multi-core processor with multiple CPUs that share a common L2 cache and bus interface.

The processor (915) may be communicatively coupled to main memory (920) and a host Peripheral Component Interconnect (PCI) bridge (925) through a main bus (930). The main memory (920) may store machine-readable instructions which are executed by the processor (915) to implement an operating system (935), the portal application (910), and a portlet pausing module (940) consistent with the principles described above. The PCI bridge (925) provides an interface between the main bus (930) and a PCI bus (945) connected to peripheral hardware components. The peripheral hardware components include a display device (950), a user input device (955), a storage interface (960) to local storage (965), other peripheral input/output interfaces (970), an RF transceiver and power amplifier(s) for a Wi-Fi connection (975), and an RF transceiver and power amplifier(s) for a cellular network (980). Electrical power may be provided to the components of the mobile device (905) from a battery (985) via a power management chip (990).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of managing a portal application, the method comprising:

in a device comprising at least one processor that executes a portal application, establishing a pausing trigger for preserving resources for the device;

determining in the device that the pausing trigger has occurred;

graying out a graphical user interface that indicates to pause operations of a portlet module;

pausing operations of the portlet module within the portal application executed by the device, wherein the pausing operations of the portlet module comprises:
intercepting any service calls received from the portlet module;
storing intercepted service calls received from the portlet module in a temporary cache during a period for which the operations of the portlet module are paused;
queuing the intercepted service calls received from the portlet module in the temporary cache;
determining if a measured power consumption for a plurality of portlets has decreased;
determining if an unpausing trigger event has occurred according to the determination that the measured power consumption for the plurality of portlets has decreased;
restoring the intercepted service calls received from the portlet module in response to the unpausing trigger event; and
sending the intercepted service calls to a number of destinations intended by the portlet module prior to the pausing operation.

2. The method of claim 1, said trigger comprising a period of inactivity by said portlet module that exceeds a predetermined threshold.

3. The method of claim 1, said trigger comprising a battery level for said device that is lower than a predetermined threshold.

4. The method of claim 1, wherein said trigger is set by a user of said device.

5. The method of claim 1, said trigger comprising an instruction received in said device to pause said portlet module.

6. The method of claim 1, wherein said portal application pauses said operations of said portlet module within said portal application.

7. The method of claim 1, wherein an operating system of said device pauses said operations of said portlet module within said portal application.

8. The method of claim 1, further comprising providing a notification that said operations of said portlet module within said portal application have been paused.

9. The method of claim 1, further comprising altering an appearance of a display of said portal application of said device to indicate that said portlet module has been paused.

10. The method of claim 1, further comprising:
determining that a second trigger for resuming operations of said portlet module has occurred; and
resuming operations of said portlet module within said portal application.

11. The method of claim 10, said second trigger comprising an instruction to resume operations of said portlet module.

12. The method of claim 11, further comprising prompting a user of said device to provide said instruction to resume operations of said portlet module.

13. The method of claim 11, second trigger comprising a battery level of said device reaching a predetermined threshold.

14. The method of claim 1, said pausing operations of said portlet module within said portal application by intercepting any calls from said portlet module comprises intercepting calls from the portlet module to an operating system of said device or to a network to which said device belongs.

15. The method of claim 14, further comprising releasing said calls from said temporary queue in response to resuming said operations of said portlet module.

16. The method of claim 1, said pausing operations of said portlet module within said portal application comprising:
saving a state of said portlet module; and
terminating said portlet module.

17. The method of claim 16, further comprising reloading said portlet module in said portal application and restoring said portlet module to said saved state in response to a second trigger to resume operations of said portlet module.

18. A computing device comprising:
a processor to execute a portal application that displays, on a graphical user interface, a number of portlets;
a pausing module to determine if a pausing event has occurred and pause operations of a first portlet within the portal application; wherein the pause operations of the first portlet comprises:
graying out a graphical user interface representing the first portlet to indicate the pause operations of the first portlet;
intercepting any service calls received from the first portlet;
storing intercepted service calls received from the first portlet in a temporary cache during a period for which the operations of the first portlet are paused; and
queuing the intercepted service calls received from the first portlet in the temporary cache;
an unpausing module to determine if an unpausing trigger event has occurred according to a determination that a measured power consumption of the number of portlets has decreased;
a reloading module to restore the intercepted service calls received from the operations of the first portlet in response to the unpausing trigger event; and
a sending module to send the intercepted service calls to a number of destinations intended by the first portlet module prior to the pausing operation.

19. The computing device of claim 18, wherein the triggering event comprises a measured power consumption associated with the first portlet, an amount of system resources requested by the first portlet, a measured level of activity for the first portlet, an elapsed time for which the first portlet had maintained a certain degree of activity, or combinations thereof.

20. A computer program product for managing a portal application, the computer program product comprising a computer readable storage medium having program instructions embodied therewith, the program instructions executable by a processor to cause the processor to:
execute, with the processor, a portal application to display a number of portlet modules;
pause, with a pausing module executed by the processor, operations of a first portlet module among the number of portlet modules when the processor has determined that a pausing trigger event has occurred;
wherein pausing operations of the first portlet module comprises:
intercepting any service calls from the first portlet module;
storing intercepted service calls from the first portlet module in a temporary cache during a period for which the operations of the first portlet module are paused; and
queuing the intercepted service calls received from the first portlet module in the temporary cache;
unpause, with an unpausing module executed by the processor, the operations of the first portlet module among the number of the portlet modules when the processor has determined that an unpausing trigger event has occurred according to a determination that a measured power consumption of the number of portlets has decreased;

restore the operations of the first portlet module by releasing the intercepted service calls from the first portlet module from the temporary cache and sending the intercepted service calls to a number of destinations intended by the first portlet module prior to the pausing operation.

* * * * *